United States Patent
Lin et al.

(10) Patent No.: US 12,235,559 B2
(45) Date of Patent: Feb. 25, 2025

(54) DOUBLE-LAYER CHOLESTERIC LIQUID CRYSTAL DISPLAY AND ITS MANUFACTURING METHOD

(71) Applicant: IRIS OPTRONICS CO., LTD., Tainan (TW)

(72) Inventors: Cheng-Yu Lin, Tainan (TW); Cheng-Hong Yao, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/732,472

(22) Filed: Jun. 3, 2024

(65) Prior Publication Data

US 2024/0411191 A1    Dec. 12, 2024

Related U.S. Application Data

(60) Provisional application No. 63/471,740, filed on Jun. 7, 2023.

(51) Int. Cl.
| | |
|---|---|
| *G02F 1/137* | (2006.01) |
| *G02F 1/1339* | (2006.01) |
| *G02F 1/1347* | (2006.01) |
| *G02F 1/135* | (2006.01) |

(52) U.S. Cl.
CPC ........ *G02F 1/13718* (2013.01); *G02F 1/1339* (2013.01); *G02F 1/1347* (2013.01); *G02F 1/1351* (2021.01)

(58) Field of Classification Search
None
See application file for complete search history.

(56) References Cited

U.S. PATENT DOCUMENTS

| 6,278,505 B1 * | 8/2001 | Okada ................. C09K 19/586 |
| | | 349/110 |
| 2013/0050622 A1 * | 2/2013 | Yoshihara ............... B32B 38/06 |
| | | 349/123 |
| 2018/0017825 A1 * | 1/2018 | Katagiri ............. G02F 1/13471 |

FOREIGN PATENT DOCUMENTS

| JP | 2010107686 A * | 5/2010 | ............... G02F 1/29 |
| TW | I773320 B | 8/2022 | |

* cited by examiner

*Primary Examiner* — Phu Vu
(74) *Attorney, Agent, or Firm* — Cheng-Ju Chiang

(57) ABSTRACT

A double-layer cholesteric liquid crystal display and its manufacturing method are disclosed. The double-layer cholesteric liquid crystal display includes three transparent substrates, two opposing electrode layers, two cholesteric liquid crystal layers, and a first light-absorbing layer. Additionally, the double-layer cholesteric liquid crystal display incorporates two drive ICs and a second light-absorbing layer. The two drive ICs can be positioned either on the same side or on opposite sides within the non-display area of the double-layer cholesteric liquid crystal display. Furthermore, the first cholesteric liquid crystal layer exhibits a first color light, and the second cholesteric liquid crystal layer exhibits a second color light, where the colors are selected as contrasting colors. Additionally, the two cholesteric liquid crystal layers possess mutually opposite optical rotary properties. The invention is capable of producing a thinner, lighter double-layer cholesteric liquid crystal display that enhances contrast and reflectivity, thereby effectively improving the overall display performance.

10 Claims, 7 Drawing Sheets

DOUBLE-LAYER CHOLESTERIC LIQUID CRYSTAL DISPLAY AND ITS MANUFACTURING METHOD

BACKGROUND OF THE INVENTION

1. Field of the Invention

This invention relates to a double-layer cholesteric liquid crystal display and its manufacturing method, particularly aimed at producing a display with a thinner overall thickness, lighter weight, and without the need for full color or high resolution.

2. Description of Related Art

The Cholesteric Liquid Crystal Display (Ch-LCD) exhibits the characteristic of bistable states, namely, a Focal Conic State and a Planar State, which are two stable states. By applying a voltage, the alignment state of the cholesteric liquid crystal molecules can be controlled, facilitating transitions between these two stable states, such as the focal conic state and the planar state.

When the cholesteric liquid crystal molecules are in the planar state, they reflect light of a specific wavelength. Conversely, when the cholesteric liquid crystal molecules are in the focal conic state, light is able to pass through liquid crystal molecules. Therefore, by applying a voltage to the cholesteric liquid crystal molecules, it is possible to control whether the light passes through the molecules or whether light of a specific wavelength is reflected. This allows the user to maintain the displayed content without power consumption. Cholesteric Liquid Crystal Displays (Ch-LCDs) are commonly used in temperature sensor displays, e-books, c-papers, electronic whiteboards, and other related products.

However, current applications such as electronic tags, as well as bus and hospital signage, do not require full color or high-resolution designs. For instance, electronic tags in stores may only need to display product prices and names using yellow, white, and black, or bus stop signs that display only in red, white, and black. Since these applications typically involve simple color distributions, using traditional three-layer cholesteric liquid crystal displays would not only increase costs but also complicate the manufacturing process.

In Patent No. TWI773320, a cholesteric liquid crystal display device is illustrated, consisting of four transparent substrates, three cholesteric liquid crystal layers, and three colored lights. However, cholesteric liquid crystal molecules have the characteristic of reflective single optical rotation. Consequently, the first layer and the third layer of the prior art exhibit the same polarization and optical rotation characteristics. This similarity in polarization and optical rotation between the first and third cholesteric liquid crystal layers results in mutual interference, leading to a poor color rendering effect. Thus, the more light the first layer of cholesterol liquid crystal reflects, the less light the third layer can reflect. Additionally, the reflected light rays can interfere with each other, further causing light leakage. Moreover, in the manufacturing process, due to the use of Optically Clear Adhesive (OCA), the process involves bonding and laminating small pieces, which significantly increases operational costs.

Therefore, in order to improve upon the known techniques and reduce costs, it is necessary to develop products tailored for simple color distributions that not only are low-cost but also exhibit high color performance. Thus, developing an ideal technological approach to address these issues is essential for creating cholesteric liquid crystal displays with such characteristics.

SUMMARY OF THE INVENTION

The objective of the present invention is to provide a double-layer cholesteric liquid crystal display and its manufacturing method, which produces displays with a thinner overall thickness and lighter weight such as electronic tags or bus and hospital signs that do not require full color or high resolution, and can also offer high contrast and high reflectivity in display performance while reducing production costs.

The present invention relates to a double-layer cholesteric liquid crystal display, which includes three transparent substrates, two opposing electrode layers, two cholesteric liquid crystal layers, and a first light-absorbing layer.

The three transparent substrates consist of a first transparent substrate, a second transparent substrate, and a third transparent substrate stacked from bottom to top.

One of the opposing electrode layers includes a first upper electrode layer and a first lower electrode layer, while the other opposing electrode layer includes a second upper electrode layer and a second lower electrode layer. The first lower electrode layer is disposed on the upper surface of the first transparent substrate, the first upper electrode layer is disposed on the lower surface of the second transparent substrate, the second lower electrode layer is disposed on the upper surface of the second transparent substrate, and the second upper electrode layer is disposed on the lower surface of the third transparent substrate.

The two cholesteric liquid crystal layers comprise a first cholesteric liquid crystal layer and a second cholesteric liquid crystal layer, both having mutually opposite optical rotary properties. The first cholesteric liquid crystal layer is positioned between the first upper electrode layer and the first lower electrode layer, and the second cholesteric liquid crystal layer is positioned between the second upper electrode layer and the second lower electrode layer.

The first light-absorbing layer is disposed on the bottom surface of the first transparent substrate.

In one preferred embodiment, the double-layer cholesteric liquid crystal display further includes two drive ICs electrically coupled to the first lower electrode layer and the second lower electrode layer, respectively. When viewed from above, the double-layer cholesteric liquid crystal display has a display area in the middle and a non-display area surrounding it. The two drive ICs are each located in the non-display area and on the same side relative to the display area. In other words, the two drive ICs are positioned on the same side within the non-display area.

In another preferred embodiment, the double-layer cholesteric liquid crystal display includes two drive ICs electrically coupled to the first lower electrode layer and the second lower electrode layer, respectively. When viewed from above, the display has a display area in the middle and a non-display area around it. The two drive ICs are each located in the non-display area and on opposite sides relative to the display area. In other words, the two drive ICs are positioned on the opposite sides of the non-display area.

Furthermore, within the double-layer cholesteric liquid crystal display, the first cholesteric liquid crystal layer exhibits a first color light, and the second cholesteric liquid crystal layer exhibits a second color light.

The double-layer cholesteric liquid crystal display additionally includes a second light-absorbing layer located between the first cholesteric liquid crystal layer and second cholesteric liquid crystal layer, which is used to absorb light at the wavelength of the second color light.

Continuing, the second lower electrode layer, through the design of thin film optics, can be manufactured as a colored conductive film capable of absorbing the wavelength of the second color light, thus functioning as the second light-absorbing layer. In other words, the second lower electrode layer can act as the second light-absorbing layer, absorbing the wavelength of the second color light.

The first cholesteric liquid crystal layer exhibits a first color light, and the second cholesteric liquid crystal layer exhibits a second color light, where the first color light and the second color light are contrasting colors. This configuration allows for the generation of white light in addition to the first color light and second color light. That is, because the first color light and the second color light are contrasting colors, they can blend to produce white light. For example, when the first second color light and second color light are chosen as blue and yellow light respectively, the double-layer cholesteric liquid crystal display can show blue, yellow, and white light. Additionally, because of the presence of the first light-absorbing layer, the double-layer cholesteric liquid crystal display can independently display blue, yellow, white, and black colors.

Further, the double-layer cholesteric liquid crystal display includes four alignment films (PI). The four alignment films are positioned on the upper and lower sides of the two cholesteric liquid crystal layers, aligning the first cholesteric liquid crystal layer and the second cholesteric liquid crystal layer to exhibit contrasting first color light and second color light.

The double-layer cholesteric liquid crystal display includes multiple photo spacers (PS). The photo spacers are placed on the external sides of the upper and lower layers of the two cholesteric liquid crystal layers to control the uniformity of these layers and to fix their positions.

Moreover, the present invention also pertains to a method for manufacturing a double-layer cholesteric liquid crystal display, which includes the following steps:

1: Forming a first lower electrode layer, a first upper electrode layer, and a second upper electrode layer respectively on a first transparent substrate, a second transparent substrate, and a third transparent substrate.
2: Injecting cholesteric liquid crystals between the first transparent substrate and the second transparent substrate to form a first cholesteric liquid crystal layer.
3: Thinning the first transparent substrate and second transparent substrate to reduce the overall thickness, achieving a thinner design.
4: Forming a second lower electrode layer on the second transparent substrate.
5: Injecting cholesteric liquid crystals between the second transparent substrate and the third transparent substrate to form a second cholesteric liquid crystal layer.
6: Thinning the third transparent substrate.
7: Attaching a first light-absorbing layer below the first transparent substrate.

Additionally, before the step of injecting cholesteric liquid crystals, the manufacturing method includes:

Forming multiple photo spacers below the first cholesteric liquid crystal layer and above the second cholesteric liquid crystal layer to control the uniformity and fix the position of the two cholesteric liquid crystal layers, and adding four alignment films. These alignment films are positioned on the upper and lower sides of the two cholesteric liquid crystal layers to align the first cholesteric liquid crystal layer and second cholesteric liquid crystal layer as contrasting colors. The photo spacers are made from photosensitive resin using well-established photolithography processes to create gaps on the black matrix (BM), precisely controlling the size and position of these gaps and preventing their movement. The alignment films may be made from polyimide, ensuring the cholesteric liquid crystals are aligned in a specific direction to produce the desired optical effects, thus enhancing the display quality of the double-layer cholesteric liquid crystal display.

The first cholesteric liquid crystal layer exhibits a first color light, and the second cholesteric liquid crystal layer exhibits a second color light, which are the contrasting colors. The double-layer cholesteric liquid crystal display also includes a second light-absorbing layer, which can be manufactured using color filter coating processes or other common deposition techniques such as sputtering, electroplating, evaporation, or chemical vapor deposition (CVD). This second light-absorbing layer is situated between the first cholesteric liquid crystal layer and second cholesteric liquid crystal layer and serves to absorb light at the wavelength of the first color light.

Therefore, by utilizing the provided method and double-layer cholesteric liquid crystal display of the present invention, it is possible to achieve a thinner, lighter overall design. Furthermore, this double-layer cholesteric liquid crystal display can reduce the process steps and increase the yield compared to traditional three-layer cholesteric liquid crystal displays. As the two cholesteric liquid crystal layers have opposing optical rotary properties and exhibit contrasting colors, this enhances the contrast and reflectivity, thereby significantly improving the overall display performance.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features of the present invention may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention. Technical features with limitation terms "first" or "second" would illustrate or imply that one or more technical features can be included. As to detailed description of the present invention, the term "more" indicates two or more unless expressly indicated otherwise.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art.

The terminology used herein is for the purpose of describing embodiments only and is not intended to limit the full scope of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

Figure 1:
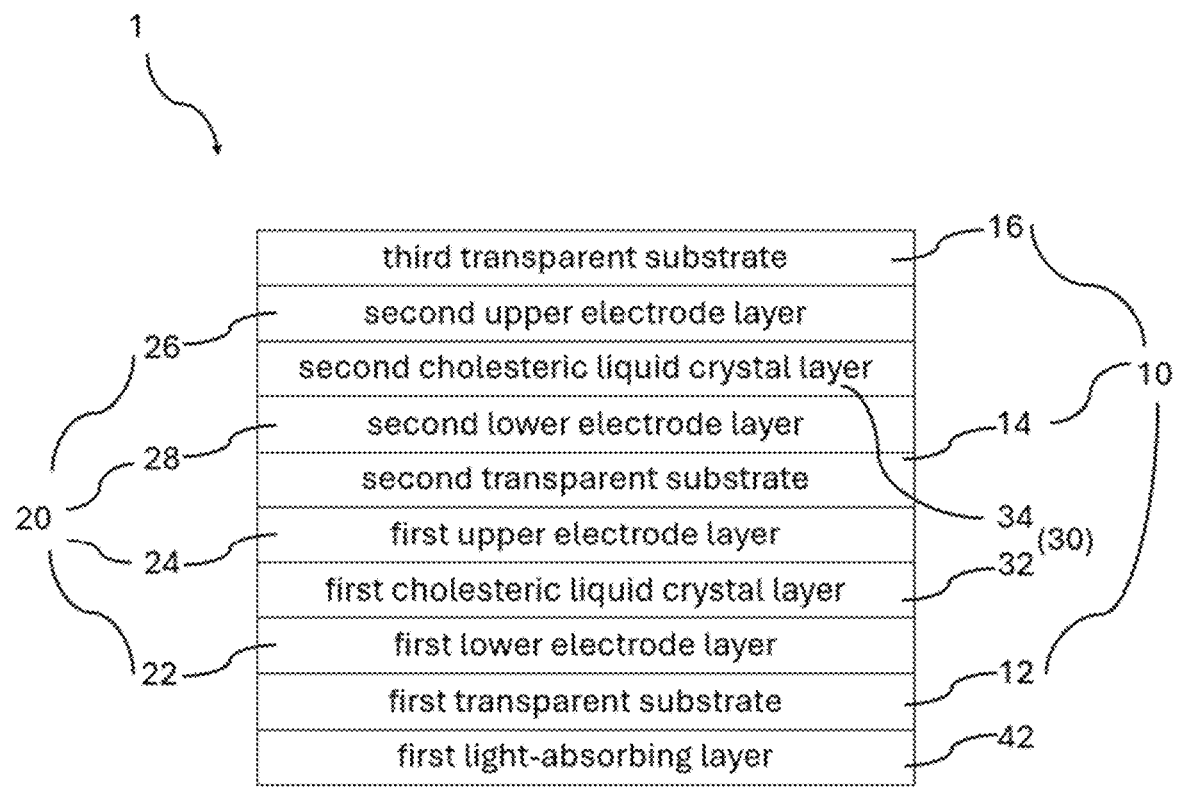
FIG. 1 is a schematic diagram of the double-layer cholesteric liquid crystal display of the present invention.

This invention relates to a double-layer cholesteric liquid crystal display and its manufacturing method. Please refer to FIG. 1, which is a schematic diagram of the double-layer cholesteric liquid crystal display of the present invention. The double-layer cholesteric liquid crystal 1 display includes three transparent substrates 10, two opposing electrode layers 20, two cholesteric liquid crystal layers 30, and a first light-absorbing layer 42.

The three transparent substrates 10 consist of a first transparent substrate 12, a second transparent substrate 14, and a third transparent substrate 16 stacked from bottom to top.

One of the opposing electrode layers 20 includes a first lower electrode layer 22 and a first upper electrode layer 24, while the other opposing electrode layer includes a second upper electrode layer 26 and a second lower electrode layer 28. The first lower electrode layer 22 is positioned on the upper surface of the first transparent substrate 12, the first upper electrode layer 24 is positioned on the lower surface of the second transparent substrate 14, the second lower electrode layer 28 is positioned on the upper surface of the second transparent substrate 14, and the second upper electrode layer 26 is positioned on the lower surface of the third transparent substrate 16.

The two cholesteric liquid crystal layers 30 consist of a first cholesteric liquid crystal layer 32 and a second cholesteric liquid crystal layer 34, both featuring mutually opposite optical rotary properties. The first cholesteric liquid crystal layer 32 is positioned between the first lower electrode layer 22 and the first upper electrode layer 24, and the second cholesteric liquid crystal layer 34 is positioned between the second upper electrode layer 26 and the second lower electrode layer 28.

The first light-absorbing layer 42 is positioned on the bottom surface of the first transparent substrate 12.

Figure 2:
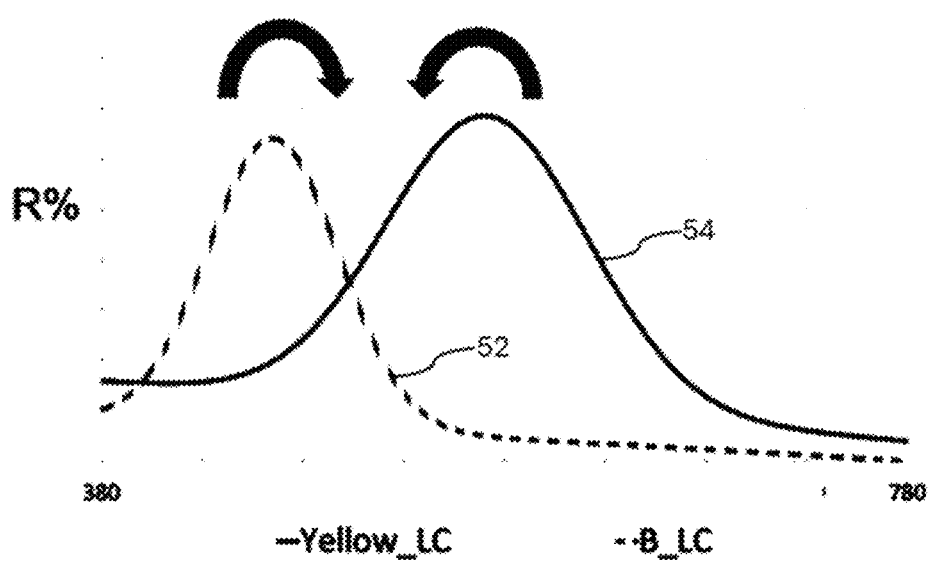
FIG. 2 is a schematic diagram showing the reflectance of contrasting colors with different optical rotations in the present invention.

Please refer to FIG. 2, which is a schematic diagram showing the reflectance of contrasting colors with different optical rotations in the present invention. As mentioned, the two cholesteric liquid crystal layers possess opposite optical rotary properties, where the first cholesteric liquid crystal layer exhibits a first color light 52, and the second cholesteric liquid crystal layer exhibits a second color light 54. These colors can be chosen from contrasting colors. As shown, blue represents a right-handed cholesteric liquid crystal layer, and yellow represents a left-handed cholesteric liquid crystal layer. The optical rotary nature of the cholesteric liquid crystal layers is associated with the added substances, which can be either right-handed or left-handed. Because the optical rotary properties of the two layers are opposite, the reflectivity of the first cholesteric liquid crystal layer does not affect the reflectivity of the second cholesteric liquid crystal layer, thus enhancing the display reflectivity. Moreover, the first cholesteric liquid crystal layer and second cholesteric liquid crystal layer can be of different colors and different optical rotary properties, or the same color but different optical rotary properties. In cases where the layers are the same color but possess different optical rotary properties, even though only one color light is reflected, the reflectivity will be double that of a single cholesteric liquid crystal layer because both optical properties reflect light, such as both layers reflecting blue light, with the first layer being right-handed and the second layer being left-handed, resulting in enhanced blue display.

Figure 3:
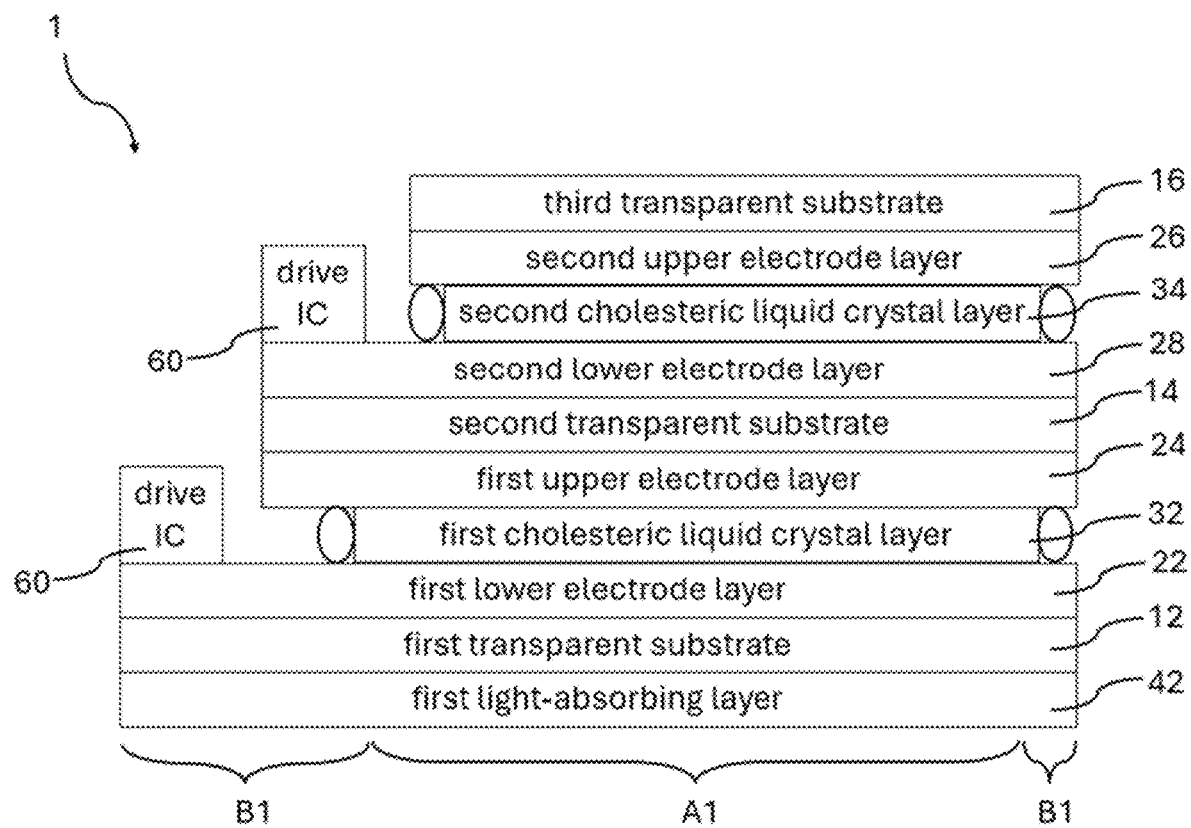
FIG. 3 is a schematic diagram of the first embodiment of the present invention.

Please refer to FIG. 3, which is a schematic diagram of the first embodiment of the present invention. The double-layer cholesteric liquid crystal 1 display further includes two drive ICs 60, electrically connected to the first lower electrode layer 22 and the second lower electrode layer 28, respectively. From a top-down perspective, the double-layer cholesteric liquid crystal 1 display features a display area A1 in the middle and a non-display area B1 around it. The two drive ICs 60 are each located in the non-display area B1 and on the same side relative to the display area A1. In other words, the two drive ICs 60 are positioned on the same side within the non-display area B1.

As shown in the diagram, from the user's perspective looking downward, the two drive ICs 60 are centrally placed on the left side of the double-layer cholesteric liquid crystal 1 display and are staggered. This central placement of the drive ICs 60 on one side simplifies the wiring design during the manufacture of the double-layer cholesteric liquid crystal 1 display, as the connections only need to be made from one side to the substrate. Furthermore, besides the possibility of staggering the two drive ICs 60 on the left side of the double-layer cholesteric liquid crystal 1 display, they can also be overlapped on the left, staggered on the right, or overlapped on the right.

Figure 4:
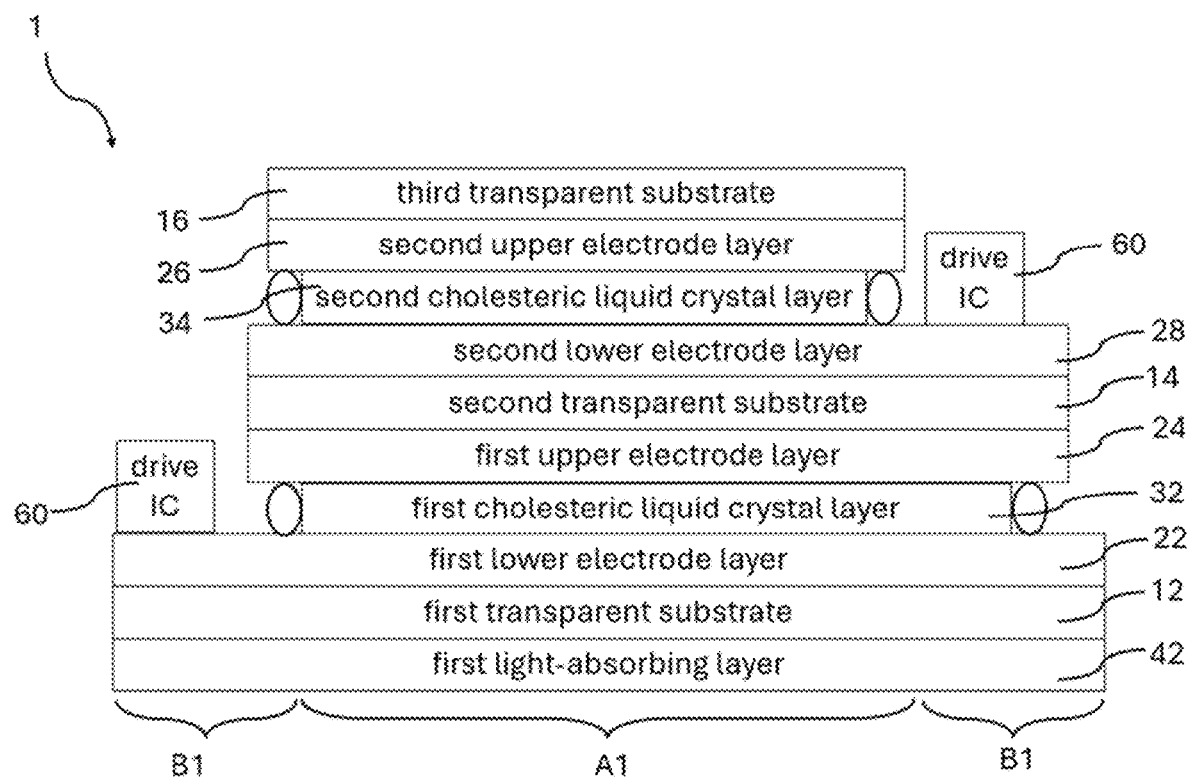
FIG. 4 is a schematic diagram of the second embodiment of the present invention.

Please refer to FIG. 4, which is a schematic diagram of the second embodiment of the present invention. The double-layer cholesteric liquid crystal 1 display additionally includes two drive ICs 60, electrically connected to the first lower electrode layer 22 and the second lower electrode layer 28, respectively. From a top-down perspective, the double-layer cholesteric liquid crystal 1 display features a display area A1 in the middle and a non-display area B1 around it. The two drive ICs 60 are each located in the non-display area B1 and on opposite sides relative to the display area A1. In other words, the two drive ICs 60 are positioned on the opposite sides of the non-display area B1.

From the user's perspective looking downward, placing the two drive ICs 60 on both the left and right sides of the double-layer cholesteric liquid crystal 1 display allows the first transparent substrate 12, the second transparent substrate 14, the third transparent substrate 16, the first lower electrode layer 22, the first upper electrode layer 24, the second upper electrode layer 26, the second lower electrode layer 28, and the cholesteric liquid crystal layers to be more concentrated in the middle. This central concentration facilitates a more centered double-layer cholesteric liquid crystal 1 display positioning during manufacturing and allows for simultaneous processing of the drive ICs' 60 wiring arrangements.

Figure 5:
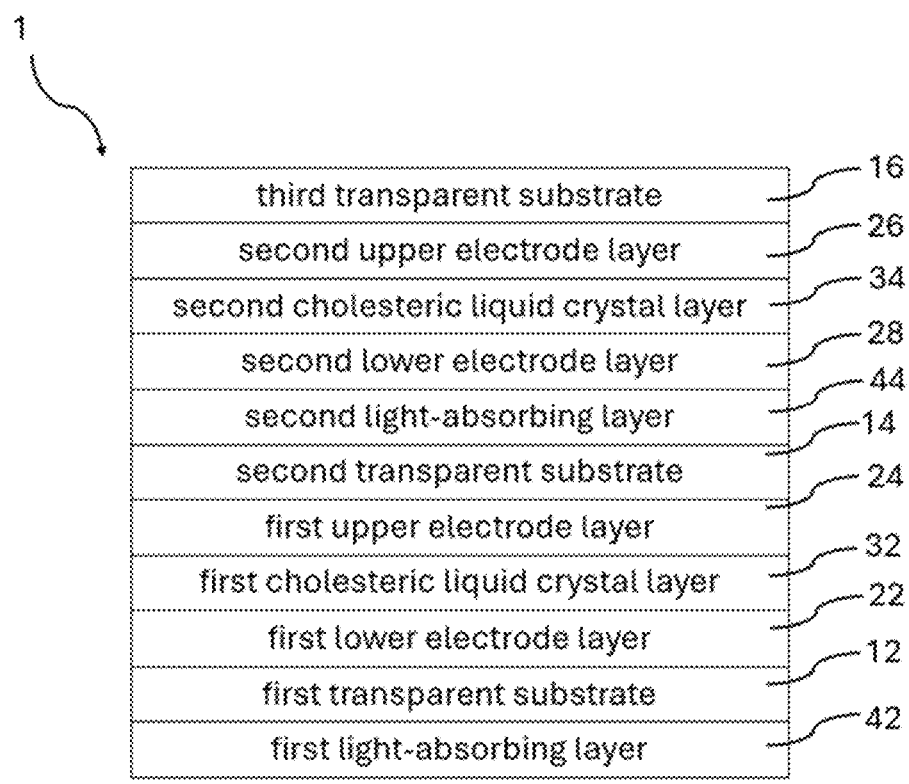
FIG. 5 is a schematic diagram of the third embodiment of the present invention.

Please refer to FIG. 5, which is a schematic diagram of the third embodiment of the present invention. The double-layer cholesteric liquid crystal 1 display further includes a second light-absorbing layer 44, positioned between the first cholesteric liquid crystal layer 32 and the second cholesteric liquid crystal layer 34. This second light-absorbing layer 44 is used to absorb light at the wavelength of the second color light, thereby enhancing the display performance of the double-layer cholesteric liquid crystal 1 display.

Continuing, the second lower electrode layer 28, through the design of thin-film optics, can be manufactured as a colored conductive film that absorbs the wavelength of the second color light, thereby functioning as the second light-absorbing layer 44. In other words, the second lower electrode layer 28 can act as the second light-absorbing layer 44, absorbing the wavelength of the second color light.

Figure 6:
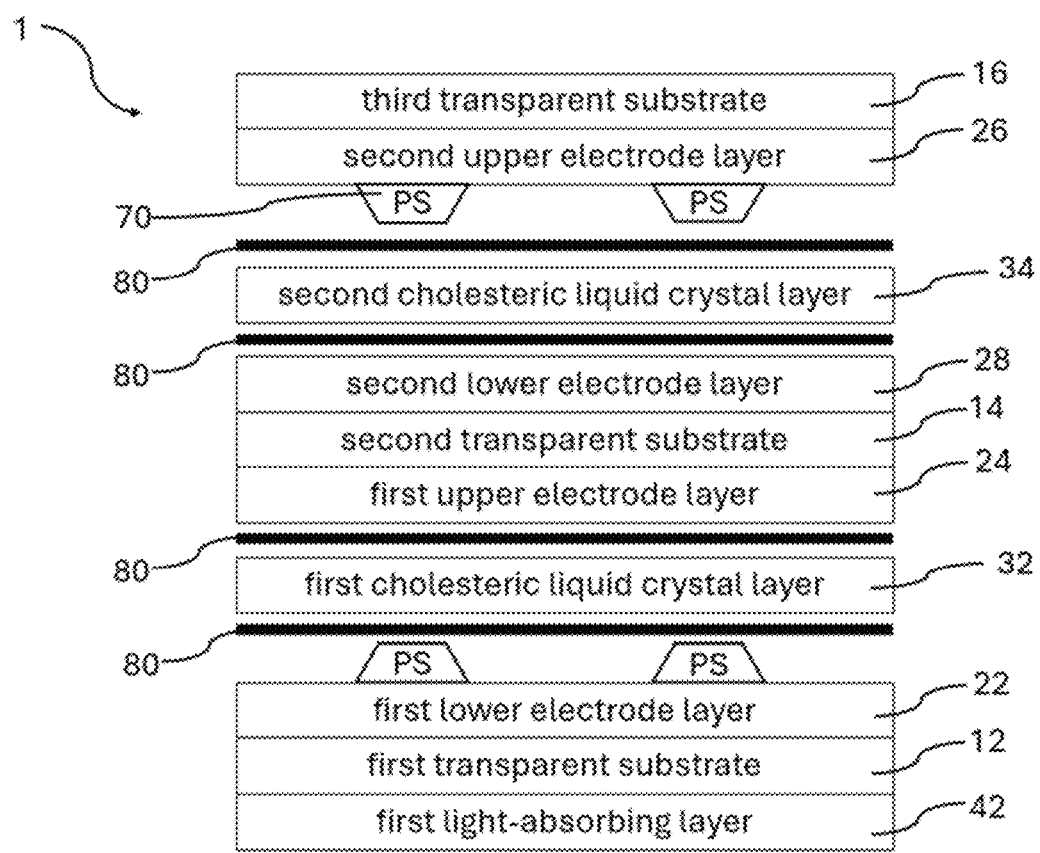
FIG. 6 is a schematic diagram of the detailed structure of the double-layer cholesteric liquid crystal display of the present invention.

Please refer to FIG. 6, which is a schematic diagram of the detailed structure of the double-layer cholesteric liquid crystal 1 display of the present invention. Furthermore, the double-layer cholesteric liquid crystal 1 display includes multiple photo spacers 70 and four alignment films 80. The four alignment films 80 are respectively positioned on the upper and lower sides of the two cholesteric liquid crystal layers to align the first cholesteric liquid crystal layer 32 and the second cholesteric liquid crystal layer 34 as contrasting first second color light and second color light. The photo spacers 70 are located on the outer sides of the upper and lower layers of the two cholesteric liquid crystal layers to control their uniformity and fix their positions.

Figure 7:
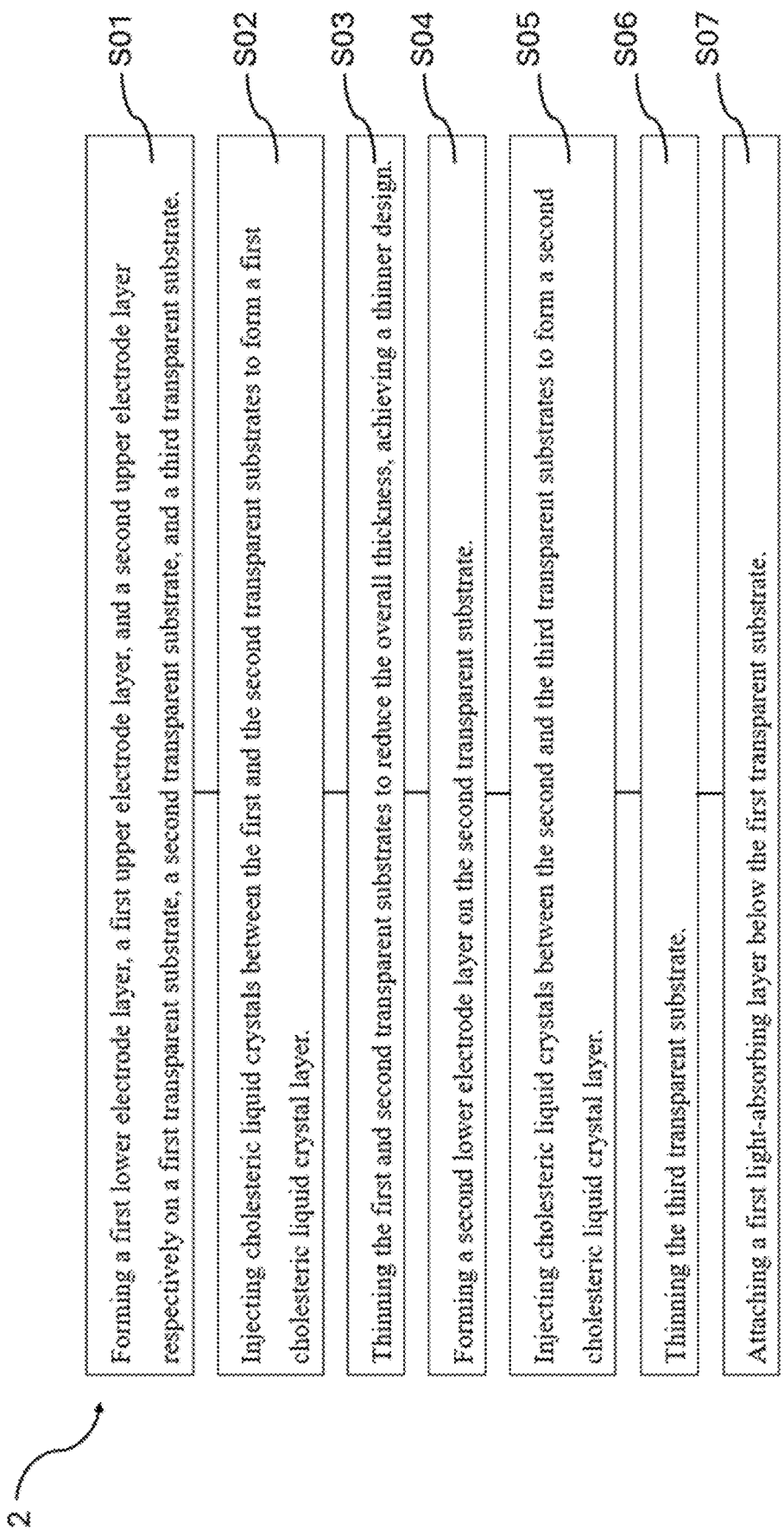
FIG. 7 is a flowchart of the manufacturing method for the double-layer cholesteric liquid crystal display of the present invention.

Moreover, this invention also pertains to a method for manufacturing a double-layer cholesteric liquid crystal 1 display. Please refer to FIG. 7, which is a flowchart of the manufacturing method for the dual-layer cholesterol liquid crystal display of the present invention.

The manufacturing method 2 includes the following steps:
Step S01: Forming a first lower electrode layer 22, a first upper electrode layer 24, and a second upper electrode layer 26 respectively on a first transparent substrate 12, a second transparent substrate 14, and a third transparent substrate 16.

Step S02: Injecting cholesteric liquid crystals between the first transparent substrate 12 and the second transparent substrate 14 to form a first cholesteric liquid crystal layer 32.

Step S03: Thinning the first transparent substrate 12 and second transparent substrate 14 using chemical mechanical polishing to achieve a thickness adjustment between 0.2 to 0.5 mm, thereby reducing the overall weight of the double-layer cholesteric liquid crystal 1 display.

Step S04: Forming a second lower electrode layer 28 on the second transparent substrate 14.

Step S05: Injecting cholesteric liquid crystals between the second transparent substrate 14 and the third transparent substrate 16 to form a second cholesteric liquid crystal layer 34.

Step S06: Thinning the third transparent substrate 16.

Step S07: Attaching a first light-absorbing layer 42 below the first transparent substrate 12.

Further, before the step of injecting cholesteric liquid crystals, the manufacturing method 2 includes the following steps:

Forming multiple photo spacers 70 below the first cholesteric liquid crystal layer 32 and above the second cholesteric liquid crystal layer 34 to respectively control the uniformity and fix the positions of the two cholesteric liquid crystal layers 30, and adding four alignment films 80. These alignment films 80 are respectively positioned on the upper and lower sides of the two cholesteric liquid crystal layers 30 to align the first cholesteric liquid crystal layer 32 and second cholesteric liquid crystal layer 34 as contrasting colors.

The first cholesteric liquid crystal layer 32 exhibits a first color light 52, and the second cholesteric liquid crystal layer 34 exhibits a second color light 54, which are the mentioned contrasting colors. The double-layer cholesteric liquid crystal 1 display further includes a second light-absorbing layer 44, which can be manufactured using color filter coating processes or other common deposition techniques such as sputtering, electroplating, evaporation, or chemical vapor deposition (CVD). This second light-absorbing layer 44 is located between the first cholesteric liquid crystal layer 32 and second cholesteric liquid crystal layer 34 and serves to absorb light at the wavelength of the second color light 54.

Therefore, by utilizing the provided double-layer cholesteric liquid crystal 1 display and its manufacturing method 2, it is possible to achieve a thinner, lighter overall design. Furthermore, this double-layer cholesteric liquid crystal 1 display reduces the number of steps and increases the yield compared to traditional three-layer cholesteric liquid crystal displays. As the two cholesteric liquid crystal layers 30 have opposite optical rotary properties and exhibit contrasting colors, this enhances the contrast and reflectivity, thereby significantly improving the overall display performance.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A double-layer cholesteric liquid crystal display, comprising:
three transparent substrates arranged from bottom to top, including a first transparent substrate, a second transparent substrate, and a third transparent substrate;

two opposing electrode layers, wherein one of the opposing electrode layers includes a first upper electrode layer and a first lower electrode layer, and the other opposing electrode layer includes a second upper electrode layer and a second lower electrode layer, wherein the first lower electrode layer is disposed on the upper surface of the first transparent substrate, the first upper electrode layer is disposed on the lower surface of the second transparent substrate, the second lower electrode layer is disposed on the upper surface of the second transparent substrate, and the second upper electrode layer is disposed on the lower surface of the third transparent substrate;

two cholesteric liquid crystal layers, including a first cholesteric liquid crystal layer and a second cholesteric liquid crystal layer, the cholesteric liquid crystal layers having mutually opposite optical rotary properties, wherein the first cholesteric liquid crystal layer is disposed between the first upper electrode layer and the first lower electrode layer, and the second cholesteric liquid crystal layer is disposed between the second upper electrode layer and the second lower electrode layer, wherein the first cholesteric liquid crystal layer exhibits a first color light, the second cholesteric liquid crystal layer exhibits a second color light;

a first light-absorbing layer, disposed on the bottom surface of the first transparent substrate; and a second light-absorbing layer, said second light-absorbing layer being located between the first cholesteric liquid crystal layer and the second cholesteric liquid crystal layer, and configured to absorb light at the wavelength of the second color light.

2. The double-layer cholesteric liquid crystal display of claim 1, wherein the double-layer cholesteric liquid crystal display further comprising two drive ICs electrically coupled respectively to the first lower electrode layer and the second lower electrode layer, wherein, when viewed from above, the double-layer cholesteric liquid crystal display has a display area in the middle and a non-display area around it, wherein the two drive ICs are respectively disposed in the non-display area on the same side relative to the display area.

3. The double-layer cholesteric liquid crystal display of claim 1, wherein the double-layer cholesteric liquid crystal display further comprising two drive ICs electrically coupled respectively to the first lower electrode layer and the second lower electrode layer, wherein, when viewed from above, the double-layer cholesteric liquid crystal display has a display area in the middle and a non-display area around it, wherein the two drive ICs are respectively disposed in the non-display area on opposite sides relative to the display area.

4. The double-layer cholesteric liquid crystal display of claim 1,
wherein the second lower electrode layer absorbs the wavelength of the second color light and functions as the second light-absorbing layer.

5. The double-layer cholesteric liquid crystal display of claim 1, wherein the first cholesteric liquid crystal layer exhibits a first color light, the second cholesteric liquid crystal layer exhibits a second color light, and the first color light and the second color light are contrasting colors.

6. The double-layer cholesteric liquid crystal display of claim 5, further comprising four alignment films, wherein the four alignment films are respectively disposed on the upper and lower sides of the two cholesteric liquid crystal layers to align the first cholesteric liquid crystal layer and the second cholesteric liquid crystal layer such that the first color light and the second color light are contrasting colors.

7. The double-layer cholesteric liquid crystal display of claim 1, further comprising multiple photo spacers, the photo spacers are disposed on the outer sides of the upper and lower layers of the two cholesteric liquid crystal layers, configured to control the uniformity of the two cholesteric liquid crystal layers and to fix the position of the two cholesteric liquid crystal layers.

8. A manufacturing method for a double-layer cholesteric liquid crystal display, comprising the steps of:
forming a first lower electrode layer, a first upper electrode layer, and a second upper electrode layer respectively on a first transparent substrate, a second transparent substrate, and a third transparent substrate;
injecting cholesteric liquid crystals between the first transparent substrate and the second transparent substrate to form a first cholesteric liquid crystal layer;
thinning the first transparent substrate and the second transparent substrate;
forming a second lower electrode layer on the second transparent substrate;
injecting cholesteric liquid crystals between the second transparent substrate and the third transparent substrate to form a second cholesteric liquid crystal layer;
thinning the third transparent substrate;
attaching a first light-absorbing layer beneath the first transparent substrate;
wherein the double-layer cholesteric liquid crystal display further comprises a second light-absorbing layer, located between the first cholesteric liquid crystal layer and the second cholesteric liquid crystal layer.

9. The method of claim 8, further comprising, prior to the step of injecting cholesteric liquid crystals, the steps of:
forming multiple photo spacers below the first cholesteric liquid crystal layer and above the second cholesteric liquid crystal layer to respectively control the uniformity of the two cholesteric liquid crystal layers and fix their positions; and
adding four alignment films, wherein the four alignment films are respectively disposed on the upper and lower sides of the two cholesteric liquid crystal layers to orient the first cholesteric liquid crystal layer and the second cholesteric liquid crystal layer as two contrasting colors.

10. The method of claim 8, wherein the first cholesteric liquid crystal layer exhibits a first color light, the second cholesteric liquid crystal layer exhibits a second color light, which are contrasting colors, and the second light-absorbing layer configured to absorb light at the wavelength of the second color light.

* * * * *